TRANSISTOR PROTECTION CIRCUITRY

Filed April 16, 1954

INVENTOR.
RALPH W. ROWLAND
BY
Theodore Jay Jr.
ATTORNEY

United States Patent Office 2,900,530

Patented Aug. 18, 1959

2,900,530

TRANSISTOR PROTECTION CIRCUITRY

Ralph W. Rowland, Silver Spring, Md., assignor to Vitro Corporation of America, Verona, N.J.

Application April 16, 1954, Serial No. 423,638

2 Claims. (Cl. 307—88.5)

My invention relates to circuitry for limiting current flow through a transistor or similar device.

It is often necessary to produce sensitive transistor operated amplifiers which will be rendered operative upon the reception of an incoming signal of one polarity and which will be rendered inoperative upon reception of a signal of opposing polarity. Certain well known techniques can be used successfully for this purpose. However, when very large signals of this one polarity are received, a correspondingly large current will flow through the transistor; this current flow can readily attain such a magnitude as to damage the transistor.

Accordingly, it is an object of the present invention to provide current limiting means for preventing excessive current flow through a transistor under the conditions indicated above.

It is a further object to provide a transistor operated amplifier wherein current limiting is accomplished through the use of a crystal diode.

Still a further object is to provide a transistor operated amplifier wherein current limiting is accomplished through the use of the unidirectional high resistance properties of a crystal diode.

Figure 1:
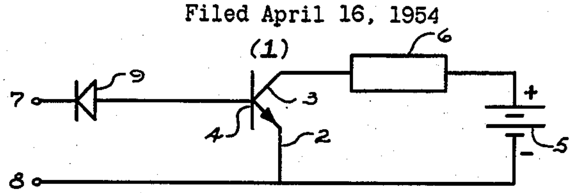
Figure 3:
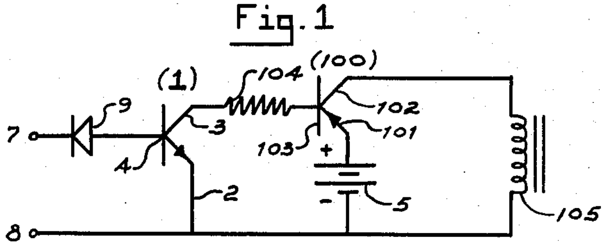
Figure 2:
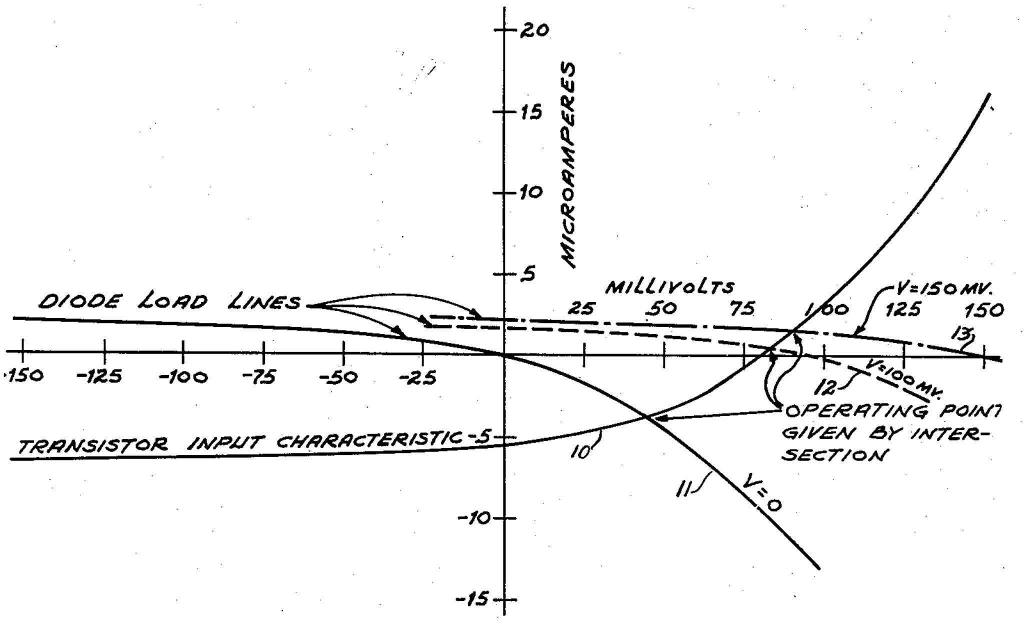
Figure 4:
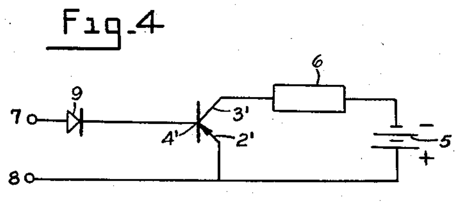

These and other objects of the invention will either be explained or will become apparent to those skilled in the art when this specification is studied in conjunction with the accompanying drawings wherein:

Figure 1 schematically illustrates the basic invention;

Figure 2 is a graph of the voltage-current characteristics of the transistor and diode shown in Figure 1;

Figure 3 schematically illustrates a relay controller circuit utilizing the invention shown in Figure 1; and Figure 4 is a circuit similar to Figure 1 and incorporating a PNP junction transistor protected from excessive current flow in accordance with the invention.

Briefly stated, my invention contemplates the use of a transistor provided with collector, emitter and base electrodes. An output circuit is connected between two selected electrodes, one of which is designated as a common electrode. An input circuit is connected between the unselected electrode and the common electrode. When a load is connected across the output circuit and suitable operating potentials are applied, an incoming signal of one selected polarity applied to the input circuit, for example a negative incoming signal, will not be amplified by the transistor regardless of its magnitude. When an incoming signal of opposing polarity is applied to the input circuit, this signal will be amplified and supplied to the load. To prevent damage to the transistor caused by excessive current flow upon the reception of incoming signals of this opposing polarity whose magnitudes exceed a predetermined value, a current limiting crystal diode is inserted within the input circuit and connected in series with one of the unselected and common electrodes. The crystal diode, which for example, can be a germanium diode, has asymmetrically conductive properties; i.e., exhibits for a signal of given polarity very low resistance when polarized in one direction and very high resistance when polarized in the other direction. The device is polarized to present very high resistance to signals of this opposing polarity and thus limit the current flow through the transistor to acceptable values.

Referring now to Figure 1 a type NPN junction transistor identified generally at 1 is provided with an emitter electrode 2, a collector electrode 3 and a base electrode 4. A battery or other source of operating potential 5 is connected between the collector and emitter electrodes with the polarity indicated. A load, identified in block form at 6, is connected between the collector electrode and the positive terminal of the battery. Incoming signals are supplied to terminals 7 and 8. Terminal 8 is connected directly to the emitter electrode; terminal 7 is connected through a crystal diode, for example, germanium diode 9, to the base electrode.

When signals of negative polarity are supplied to terminals 7 and 8, the crystal diode 9, polarized in the manner shown, acts as a very low resistance. The properties of the circuit are such that the transistor acts as a very high resistance and does not amplify when the signals are negative and substantially no current is delivered to load 6.

When signals of positive polarity are supplied to these terminals, diode 9 acts as a very high resistance and allows only a small current to flow in the base electrode emitter electrode circuit. This current after amplification in the transistor is sufficient to actuate the load but is too small to damage the transistor.

When a PNP junction transistor is used, and the polarities of the diode and battery are reversed, the above circuit exhibits current limiting for incoming signals of negative polarity. In particular, referring to Figure 4 a PNP junction transistor having an emitter 2', a collector 3' and a base 4' is connected in the same circuit shown in Figure 1. However, the polarities of the potential source 5 and the crystal diode 9 are reversed. Thus, the diode 9 is polarized to present a high impedance to negative signals, thereby limiting current flow to a value low enough to prevent damage to the transistor and yet sufficient after amplification to energize the load 6.

It will be apparent to those skilled in the art that, as the input and output connections to the transistor can be switched to different electrodes to produce different input and output impedances and as different types of transistors are used, the polarization of diode 9 must be changed accordingly.

Figure 2 shows graphically the voltage-current characteristics for a typical NPN junction transistor and a typical germanium diode. The transistor characteristic which is unaffected by changes in the positive input signal V is identified at 10. The diode characteristics for $V=0$ millivolts, $V=100$ millivolts and $V=150$ millivolts are identified at 11, 12 and 13 respectively. The input current for these three conditions is determined from the point of intersection of the transistor characteristic curve with the appropriate diode characteristic curve. Thus, when $V=150$ millivolts, the current will be about 1.5 microamperes. On the other hand, removal of the diode 9 from the circuit would permit a current flow of about 15 microamperes.

Figure 3 illustrates a relay controller circuit in accordance with the present invention wherein components having the same function as in Figure 1 are identified with the same numbers.

In this circuit, an additional transistor type PNP identified generally as 100 is provided with an emitter electrode 101, a collector electrode 102 and a base electrode 103. The battery 5 with polarity as indicated supplies a positive potential to emitter electrode 101 of transistor 100 and also, through the base electrode 103 and resistor 104, to the collector electrode 3 of transistor 1. The emitter electrode 2 of transistor 1 is connected to the negative side of battery 5. A relay winding 105 is connected between the negative side of battery 5 and the collector electrode 102 of transistor 100.

With this arrangement, the relay winding remained de-energized for all incoming signals of negative polarity and became energized as soon as an incoming signal of positive polarity attained a value of 75 millivolts. The limiting operation of the diode 9 was sufficient to limit the current through the base electrode of transistor 100 to 100 microamperes for an incoming signal of 20 volts.

While I have described and pointed out the novel features of this invention as applied to the embodiments shown, many variations within the scope and sphere of this invention will be apparent to those skilled in the art and I desire not to be limited except as in the claims which follow.

I claim:

1. Transistor amplifier circuits comprising an NPN junction transistor having collector, emitter and base electrodes, a loaded output circuit including the collector electrode and one of the base and emitter electrodes, two amplifier input terminals adapted to be joined to a source of signals, means to energize the transistor electrodes to present a low impedance to current flow resulting from signals of one polarity applied across the base and emitter electrodes and a high impedance to current flow resulting from signals of opposite polarity applied across the base and emitter electrodes, whereby only the current flow caused by the one polarity signals will be amplified to provide load energization, a crystal diode connected to carry the entire current flowing between one of the input terminals and the other of the base and emitter electrodes, the crystal diode being in a series circuit between the input terminals which also includes the base and emitter electrodes, the crystal diode being polarized to present a high impedance to the current flow caused by the one polarity signals to which the transistor presents a low impedance to limit the transistor current flow and thereby prevent damage to the transistor from excessive current flow.

2. Transistor amplifier circuits comprising a PNP junction transistor having collector, emitter and base electrodes, a loaded output circuit including the collector electrode and one of the base and emitter electrodes, two amplifier input terminals adapted to be joined to a source of signals, means to energize the transistor electrodes to present a low impedance to current flow resulting from signals of one polarity applied across the base and emitter electrodes and a high impedance to current flow resulting from signals of opposite polarity applied across the base and emitter electrodes, whereby only the current flow caused by the one polarity signals will be amplified to provide load energization, a crystal diode connected to carry the entire current flowing between one of the input terminals and the other of the base and emitter electrodes, the crystal diode being in a series circuit between the input terminals which also includes the base and emitter electrodes, the crystal diode being polarized to present high impedance to the current flow caused by the one polarity signals to which the transistor presents a low impedance to limit the transistor current flow and thereby prevent damage to the transistor from excessive current flow.

References Cited in the file of this patent

UNITED STATES PATENTS

| | | |
|---|---|---|
| 2,569,345 | Shea | Sept. 25, 1951 |
| 2,584,990 | Dimond | Feb. 12, 1952 |
| 2,627,039 | MacWilliams | Jan. 27, 1953 |
| 2,655,609 | Shockley | Oct. 13, 1953 |
| 2,663,806 | Darlington | Dec. 22, 1953 |
| 2,665,845 | Trent | Jan. 12, 1954 |
| 2,676,271 | Baldwin | Apr. 20, 1954 |
| 2,691,073 | Lowman | Oct. 5, 1954 |
| 2,698,416 | Sherr | Dec. 28, 1954 |
| 2,705,287 | Lo | Mar. 29, 1955 |
| 2,751,545 | Chase | June 19, 1956 |
| 2,758,208 | Grayson | Aug. 7, 1956 |
| 2,760,087 | Felker | Aug. 21, 1956 |

OTHER REFERENCES

"Complementary Symmetry in Transistor Circuits," by Lohman, Electronics, September 1953, pages 140–143.